UNITED STATES PATENT OFFICE.

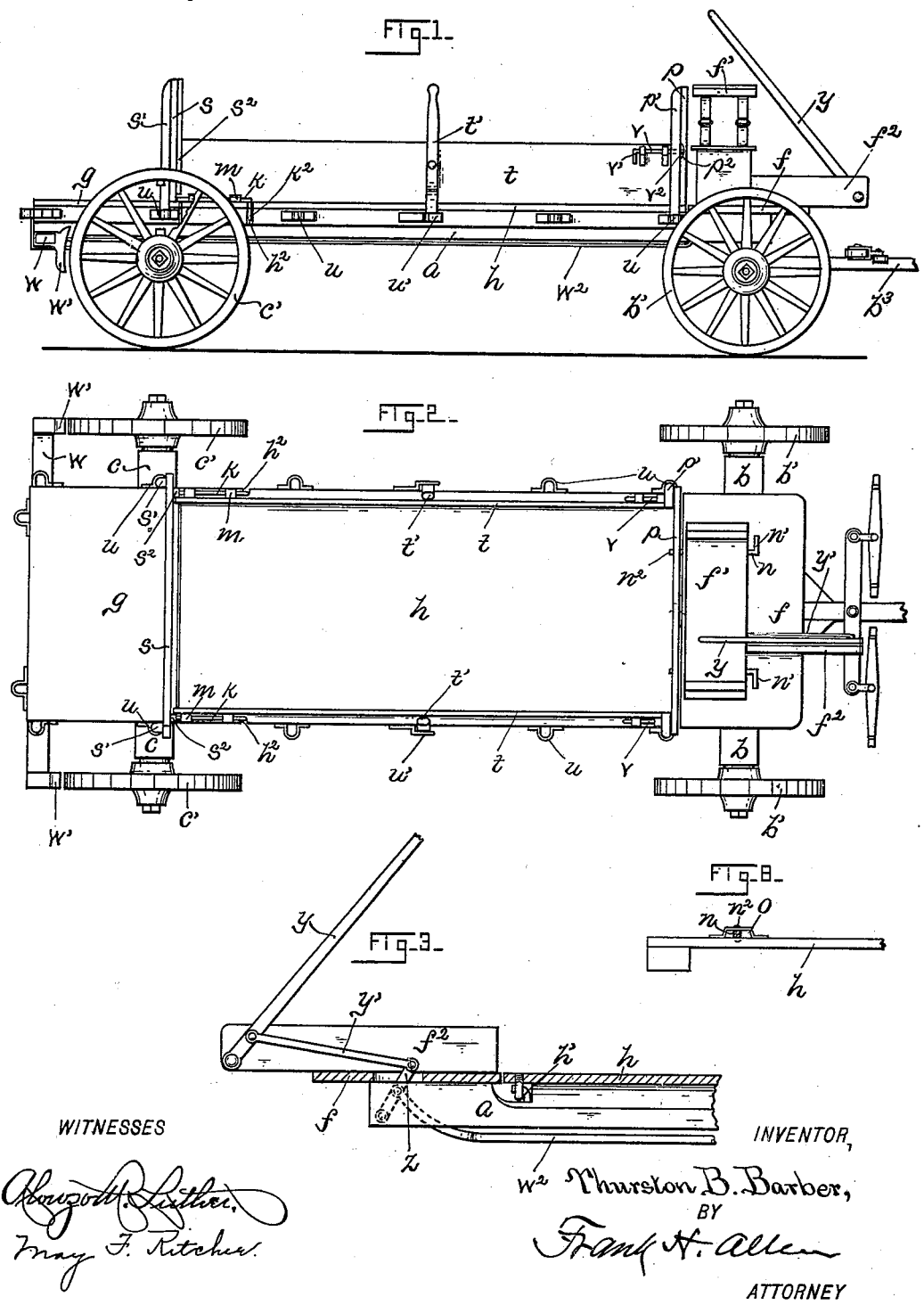

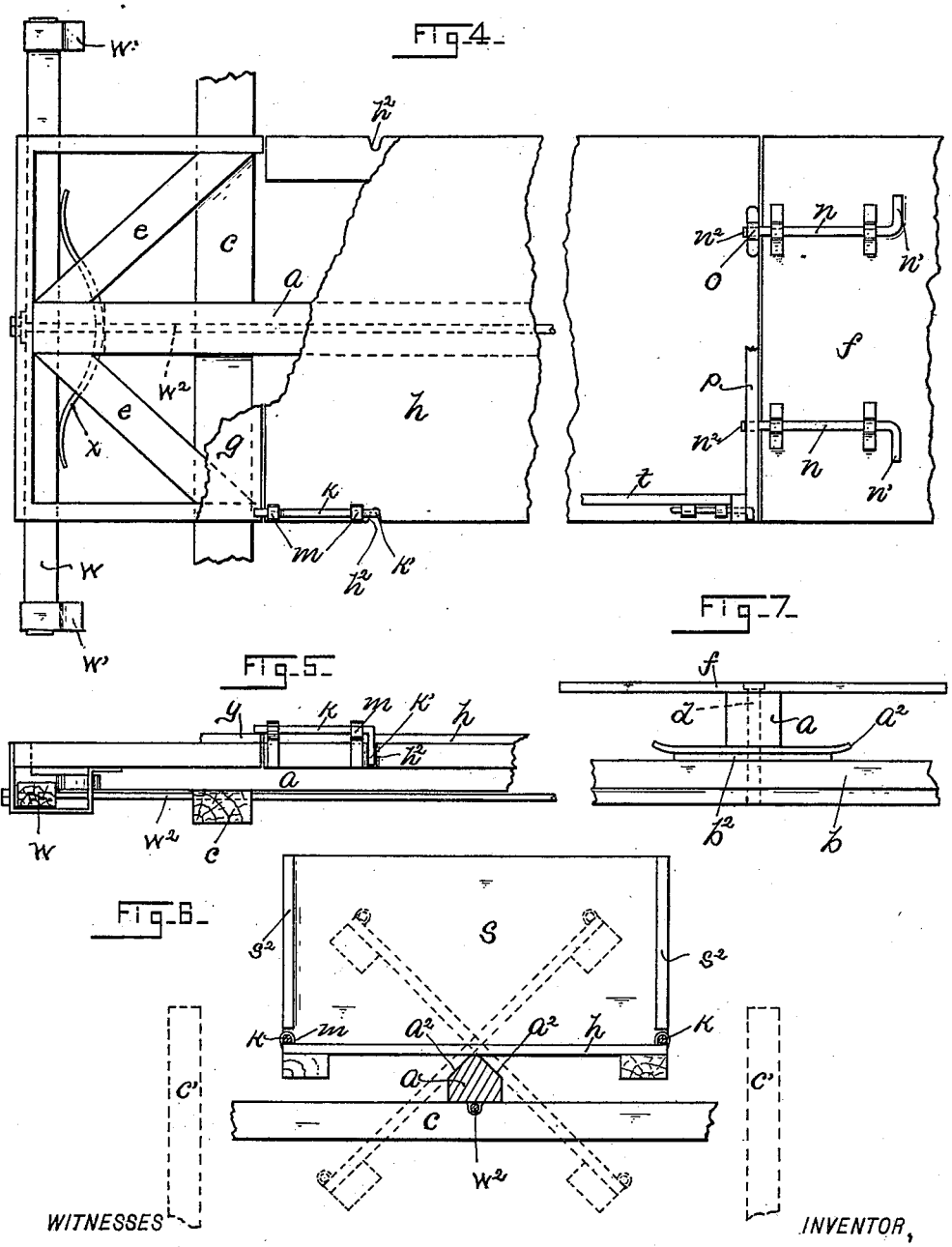

THURSTON B. BARBER, OF NORWICH, CONNECTICUT.

WAGON.

SPECIFICATION forming part of Letters Patent No. 648,829, dated May 1, 1900.

Application filed May 29, 1899. Serial No. 718,721. (No model.)

*To all whom it may concern:*

Be it known that I, THURSTON B. BARBER, a citizen of the United States, residing at Norwich, in the county of New London and State of Connecticut, have invented certain new and useful Improvements in Wagons, of which the following is a full, clear, and exact description.

This invention has for its object the provision in a single vehicle of a combined dumping and platform wagon.

Briefly described, my invention consists in providing a wagon the major portion of whose body may be readily utilized as a dumping-body that is adapted to tip sidewise to deposit its load rather than rearward, as is ordinarily the case in dumping-wagons. In connection with the said dumping-body means is provided whereby it may be securely locked to the stationary portion of the body when it is desired to use the vehicle as an ordinary platform-wagon.

My invention also includes certain brake mechanism designed for use with my newly-invented wagon and also certain minor details of construction, all of which are fully set forth hereinafter.

To assist in explaining my invention, the accompanying drawings have been provided, illustrating the same, as follows:

Figure 1 shows in side elevation my newly-invented wagon, and Fig. 2 is a plan view thereof. Fig. 3 illustrates in elevation a portion of the brake mechanism. Fig. 4 is a plan view of a portion of the wagon-body, showing the manner in which the same is constructed; and Fig. 5 shows in elevation certain of the features of Fig. 4. Fig. 6 illustrates, principally in elevation, the manner in which the wagon is dumped. Fig. 7 shows in front elevation the manner in which the forward portion of the wagon is assembled, and Fig. 8 illustrates a certain detail of construction hereinafter explained.

Referring to the drawings, the letter $a$ denotes the reach of the wagon, supported over and upon the front and rear axles $b$ and $c$, which latter bear, respectively, the forward and rear wheels $b'$ $c'$ of the wagon. At its forward end the reach $a$ has a plate $a^2$ secured to its under side, which rests upon a similar plate $b^2$, located on the upper side of the axle $b$. The axle $b$ is pivotally secured to the forward end of the reach by a king-bolt $d$, upon which it is adapted to turn, and when thus moved the plates $a^2$ $b^2$ ride upon each other like the ordinary "fifth-wheel," as will be readily understood by referring to the drawings, Fig. 7. The rear end of the reach $a$ extends a considerable distance beyond the axle $c$ to permit of the bracing of the latter at its rear side, this being necessary in order that the braces may be carried out of the way of the dumping portion of the wagon-body. The office of the braces is to retain the axle at all times at right angles to the reach, and such bracing is accomplished by means of two beams $e$, located, respectively, on opposite sides of the reach and extending from the rear end thereof to points near the outer ends of the axle, this construction serving to hold the axle rigidly in position.

The body of my newly-invented wagon consists of three platforms resting directly upon the reach $a$. The reference-letter $f$ denotes the forward platform, and $g$ the rear platform, both being secured rigidly to the reach $a$. The central platform $h$, extending from a point just in the rear of the wagon-seat $f'$, located on the platform $f$, to a point just forward of the rear axle $c$, is secured to the reach by means of hinges $h'$, located at any suitable points on said reach. The opposite sides of the reach are beveled, as at $a^3$, to permit the tilting of portion $h$, as shown in dotted lines in Fig. 6. When the platform $h$ is in its horizontal position, it rests upon the apex formed by the meeting of the beveled walls $a^3$, but when the platform $h$ is tipped it rocks into engagement with one of the said beveled faces $a^3$, as seen in the drawings. It will now be seen that when the platform $h$ is tipped as described should there be any load thereon the latter will be deposited at the side of the vehicle rather than at the rear, as in the case in ordinary dumping-wagons, and it will also be understood that the bracing $e$ of the rear axle being in the rear of the latter will be entirely out of the way of the platform $h$, and therefore will not interfere with the tipping of the latter.

To retain the platform $h$ in a horizontal position, suitable locking devices are provided. Such locking of the body portion $h$ is attained, preferably, by means of bolts in the following-described manner: The reference-letter $k$ denotes two of the said bolts, located on the platform $h$ at the end thereof adjacent the platform $g$ and at the opposite corners of said end. The bolts $k$ are adapted to slide in bearings $m$, secured to the platform $h$, and when in their rearward position their ends project over and engage the upper side of the platform $g$, thus serving to prevent the platform $h$ from rocking upon the reach $a$. To prevent the accidental displacement of the bolts $k$ when in their last-named position, they are provided with right-angular extensions $k'$, which are adapted to be received in notches $h^2$ in the platform $h$. By slightly rotating the bolts $k$ it will be seen that the said right-angular extensions $k'$ may be readily rocked into or out of the notches $h^2$ to accomplish the locking or releasing of the bolts $k$. Two bolts $n$, similar to the bolts $k$, are provided on the platform $f$ and are adapted to engage the body portion $h$ on each side its central support. To lock the bolts $n$ against displacement, the rear ends thereof are adapted to slide beneath plates $o$, secured to the upper face of the platform $h$, and said bolt ends are provided with hook portions $n^2$, that engage the plates $o$ when the right-angular extensions $n'$ of the bolts are in contact with the body portion $f$, Figs. 4 and 8, and thus serve to prevent the sliding of the bolts $n$ until they are first rotated sufficiently to permit the withdrawal of their hook portions $n^2$ from beneath the plates $o$.

To inclose the body portion $h$ of the wagon, head and tail boards, denoted, respectively, by the letters $p$ and $s$, and side-boards $t$ are provided. The head and tail boards $p$ and $s$ are substantially like those of ordinary vehicles and are retained in position by means of stakes $p'$ $s'$, whose lower ends are received in stake-irons $u$, provided in the sides of the wagon-body. The headboard $p$ I locate, preferably, upon the platform $h$, just in the rear of the wagon-seat $f'$, the lower edge of said board being properly cut out to receive the plates $o$ and the tailboard $s$ is preferably located upon the body portion $g$, adjacent to the said body portion $h$, the said board $s$ being thus located in order that it may not interfere with the wheels $c'$ upon the tilting of the platform $h$. The side-boards $t$ are secured in position in the following-described manner: Each side-board has pivotally secured thereto, midway its length, a lever $t'$, the lower end of which when the side-board is in position is adapted to be rocked into engagement with an iron $u'$, secured to the wagon-body $h$. The forward ends of the boards $t$ are each provided with a locking-bolt $v$, similar to the bolts $k$ and $n$. When the side-boards are in operative position, the forward hooked end $v^2$ of the bolt $v$ is received in an opening $p^2$, provided in the headboard $p$ in the rear of its stake-posts $p'$, the manipulation of the said bolt being readily attained through its right-angular extension $v'$. To secure the rear ends of the side-boards $t$, said ends are adapted to be received against the inner side of vertically-extending strips $s^2$, secured to the opposite ends of the tailboard $s$. It will now be seen that the side-boards $t$ may be readily placed in position and held therein or may be as readily removed from the wagon-body.

Should it be desired to use the entire length of the wagon-body, the head and tail and side boards may be readily removed, thus leaving the entire platform unobstructed excepting the seat $f'$, which latter may also be removed, if desired. Should only the body portions $g$ and $h$ be required for use, which would be usually the case, and should it be desired to inclose such portions, the tailboard $s$ may be moved to the rear end of the platform $g$ and side-boards $t$ of sufficient length to include both of said platforms $g$ and $h$ be provided, the tipping portion of the platform being of course locked against movement.

To provide a brake that will not interfere with the tilting of the wagon-body, I have constructed a brake which engages the rear wheels $c'$. The letter $w$ denotes the brake-beam, located beneath the body portion $g$, the same being suitably supported and bearing at its opposite ends brake-shoes $w'$, adapted to engage the wheels $c'$. Centrally secured to the under side of the reach $a$ is a spring $x$, whose opposite ends engage the brake-beam on each side the reach and which spring seeks constantly to force the brake-beam $w$ rearward to carry the shoes $w'$ out of contact with the wheels $c'$. To enable the driver to force the brake-shoes $w'$ into contact with the wheels $c'$ when it is desired to apply the brake, a rod $w^2$ is provided, which rod is secured centrally to the brake-beam $w$ and extends beneath the reach $a$ to the forward end of the wagon, where it is connected with suitable lever mechanism whereby the said rod may be drawn forward to set the brake. This lever mechanism is located at the forward end of the wagon, and in order that it may not interfere with the pole $b^3$ it is elevated above the platform $f$. In the drawings the letter $f^2$ denotes a beam secured to the said platform $f$ and extending somewhat forward thereof and having pivotally secured thereto the brake-lever $y$, which latter is connected by a link $y'$ to the upper end of a short lever $z$, pivotally secured to the forward end of the reach $a$ and having also secured thereto midway its length the forward end of the rod $w^2$. It will now be readily seen that when the lever $y$ is rocked forward the link $y'$ serves to correspondingly actuate the lever $z$, and the latter serves to draw the rod $w^2$ forward to apply the brake to the wheels, as above explained. Upon the release of the lever $y$ the spring $x$ acts to return the several elements of the brake mechanism to their respective normal positions. In connection with the described lever mechanism it will be seen that a double leverage is secured and much greater power attainable by reason of the presence of the lever $z$ than would be secured were the rod $w^2$ secured directly to the lever $y$.

My newly-invented wagon is not expensive to build, and may be used both as a dumping-wagon and as an ordinary platform-wagon.

Having thus described my invention, I claim—

In a dumping-wagon, in combination, front and rear axles, a reach connecting the said axles and extending beyond the rear axle as set forth, braces connecting the rearwardly-extending end of the reach with the rear axle, a dumping body-section hinged to the reach between the axles and adapted to dump sidewise, and means for locking the said dumping-section in its normal, level, position, all substantially as specified.

Signed at Norwich, Connecticut, this 18th day of May, 1899.

THURSTON B. BARBER.

Witnesses:
ALONZO M. LUTHER,
FRANK H. ALLEN.